May 17, 1955 A. J. WRIGHT 2,708,404

TAPE FEEDING MEANS FOR HECTOGRAPHIC DUPLICATING MACHINES

Filed Jan. 26, 1951

4 Sheets-Sheet 1

INVENTOR.
ANSEL J. WRIGHT
BY Paul, Paul & Moore
ATTORNEYS

May 17, 1955 A. J. WRIGHT 2,708,404

TAPE FEEDING MEANS FOR HECTOGRAPHIC DUPLICATING MACHINES

Filed Jan. 26, 1951

4 Sheets-Sheet 2

INVENTOR.
ANSEL J. WRIGHT
BY Paul, Paul & Moore
ATTORNEYS

May 17, 1955 A. J. WRIGHT 2,708,404

TAPE FEEDING MEANS FOR HECTOGRAPHIC DUPLICATING MACHINES

Filed Jan. 26, 1951 4 Sheets-Sheet 3

INVENTOR.
ANSEL J. WRIGHT
BY Paul, Paul & Moore
ATTORNEYS

May 17, 1955 A. J. WRIGHT 2,708,404

TAPE FEEDING MEANS FOR HECTOGRAPHIC DUPLICATING MACHINES

Filed Jan. 26, 1951 4 Sheets-Sheet 4

INVENTOR.
ANSEL J. WRIGHT
BY Paul, Paul & Moore
ATTORNEYS 2,708,404

TAPE FEEDING MEANS FOR HECTOGRAPHIC DUPLICATING MACHINES

Ansel J. Wright, Minneapolis, Minn., assignor to Master Addresser Company, Minneapolis, Minn., a partnership Application January 26, 1951, Serial No. 207,921

8 Claims. (Cl. 101—134.5)

This invention relates to new and useful improvements in duplicating machines and especially to improvements in the tape feeding mechanisms of such machines. More particularly the invention relates to new and useful improvements in duplicating machines designed for automatic tape feeding operation.

A certain type of duplicating machine is designed particularly for the reproduction of a list of material typed upon a roll of master tape. In the most frequent example of this type of machine, the material typed upon the master tape comprises a series of units of three or four lines of typing and is a list of the names and addresses of various persons or companies. Machines of this type are very often used for addressing envelopes when mail is being sent to persons and companies on a mailing list used for sales promotion, billings, etc. An exemplary machine of this type is illustrated in my patent, Reissue No. 23,279, and this invention forms an improvement of and is particularly designed for use in conjunction with duplicating machines of the same or similar types.

The hectographic tape used in duplicating machines of this type, after having the addresses typed thereon, is wrapped or wound upon a roller spool which is then placed in the machine. The tape is then passed over a platen and secured to a takeup roller spool at another part of the machine. The material to be imprinted upon successive envelopes or sheets of paper, usually the name and address of a particular person, or company, is then centered under a guide by sighting the typed data of the master tape with reference to a guide on the platen, and then an impression platen presses the envelope or copy sheet into contact with the particular material upon said master tape after said envelope or copy sheet has been moistened.

Between each such duplicating operation, the operator winds the tape until another group of typed lines giving, for example, a name and address, is brought into registry with the guide or sighting arrangement of the platen. This movement of said tape and the sighting for centering and locating the data takes time and is disadvantageous. It is to the problem of tape feeding in such hectographic machines that the instant invention is directed.

It is therefore an object of this invention to provide an improved hectographic machine having an automatic feed for the master tape upon which the data to be reproduced is carried.

It is a further object of this invention to provide a hectographic machine having an automatic tape feeding mechanism whereby the tape is automatically fed forward a predetermined distance each time the impression means is operated for imprinting the desired material upon the copy sheet, provision being made for adjustment of such automatic feed by the operator.

It is a further object of the invention to provide a hectographic machine having an improved automatic tape feeding mechanism wherein said tape feeding mechanism may be adjusted for feeding said tape a variable predetermined distance, and whereby the impression may be accurately centered relative to the work.

It is a further object of the invention to provide in a hectographic machine an automatic feeding mechanism which may readily be placed in a released or inoperative position, whereby the master tape may be inserted or removed or adjusted therein for the feeding operation.

It is a further object of the invention to provide an improved hectographic machine comprising an automatic tape feeding mechanism whereby quick, efficient, uniform feeding of the tape is accomplished, and wherein means is provided for readily inserting said tape therein.

Other and further objects of the invention are those which are inherent and apparent in the drawings, description and claims as herein contained.

This invention will be described with reference to the drawings in which corresponding numerals refer to the same parts and in which.

Figure 1:
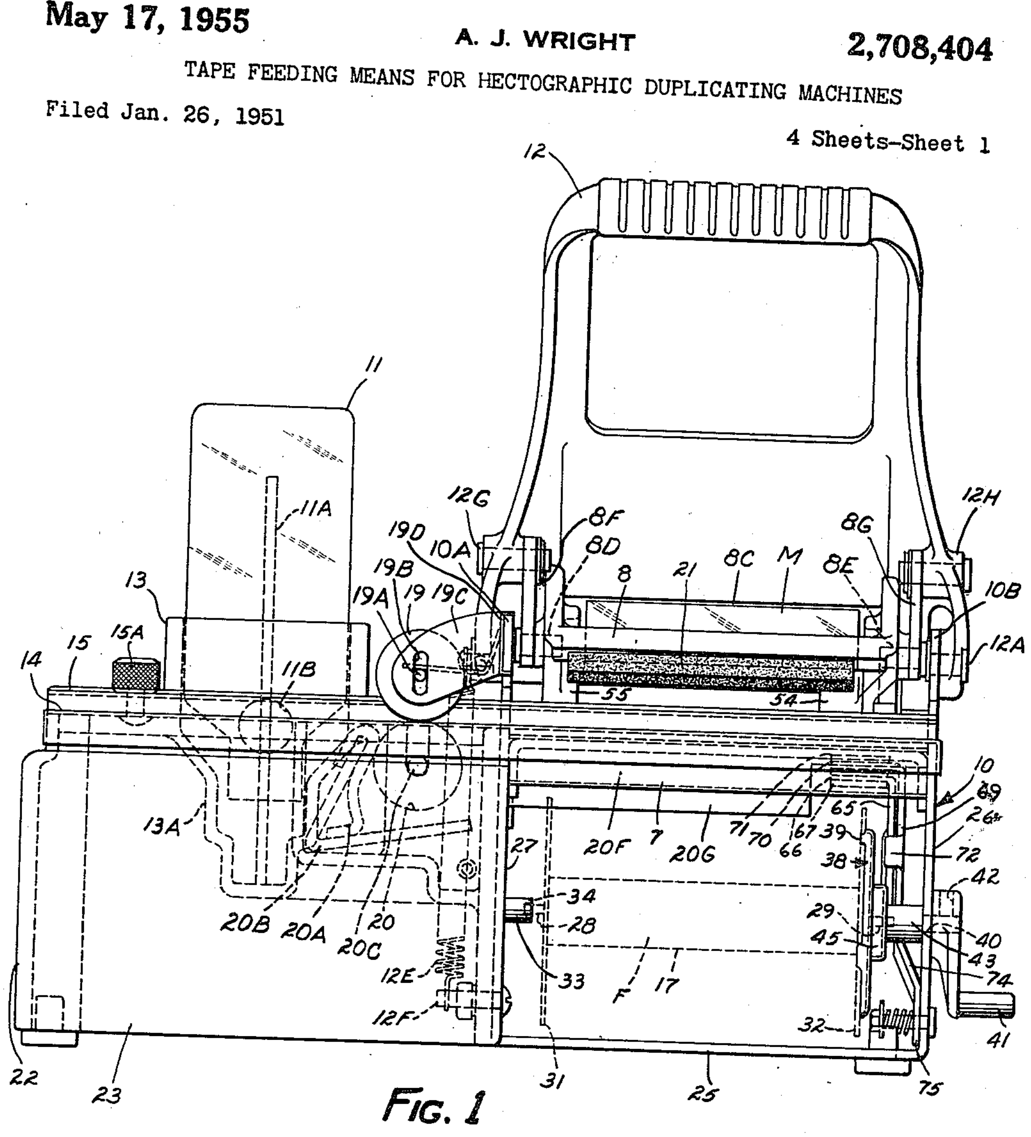
Figure 1 is a front elevation of a duplicating machine embodying the apparatus of the instant invention.

The improved duplicating machine of the present invention can, in general, be constructed according to my patent, Reissue 23,279, the disclosure of which is incorporated herein by reference. In that patent, the construction is such that the hectographic master tape is not automatically advanced, and this invention is most particularly directed to improvements which provide for such automatic advance of the tape in the duplicating machine.

As in my patent, Reissue 23,279, the machine includes a base frame, generally designated 10 which has a left side wall portion 22, a front wall 23 and a right side wall 26. In addition there is an intermediate wall 27 which serves to enclose the space between the walls 22, 23 and 27 into a housing. The space between walls 26 and 27 is open leaving a tunnel between them. A bottom member 25 extends entirely across the base of this tunnel and connects walls 26 and 27 together.

The top surface of the main frame casting is provided with a smooth metal deck or platen 14 having slots 14A and 14B in it, which serve as a means for adjustably attaching the guide 15 by means of the screws 15A and 15B. The guide 15 may thus be adjusted forward and backward on the platen 14 so as to permit letters or envelopes of varying widths to be positioned easily upon the platen for addressing.

The rear portion of the base casting is provided with a bottle-support at 13 into which a bottle 11 containing spirit duplicator liquid may be inverted. The bottle has a stem 11A carrying the valve ball 11B and when inverted, as shown in Figure 1, the valve is open thus permitting the spirit liquid to flow out of the bottle 11 and into a well 13A. The well 13A extends forwardly and to the right in respect to Figure 2 and provides a space for containing a wick 20A that is held in place by means of a metal brace 20B. The wick 20A which is thus saturated with spirit liquid carries the liquid upwardly and serves to wet the surface of a roller 20 which is mounted on axle 20C so as to rotate freely. The platen 14 is provided with an aperture at 14C through which the roller 20 extends very slightly above the surface of the platen.

Figure 2:
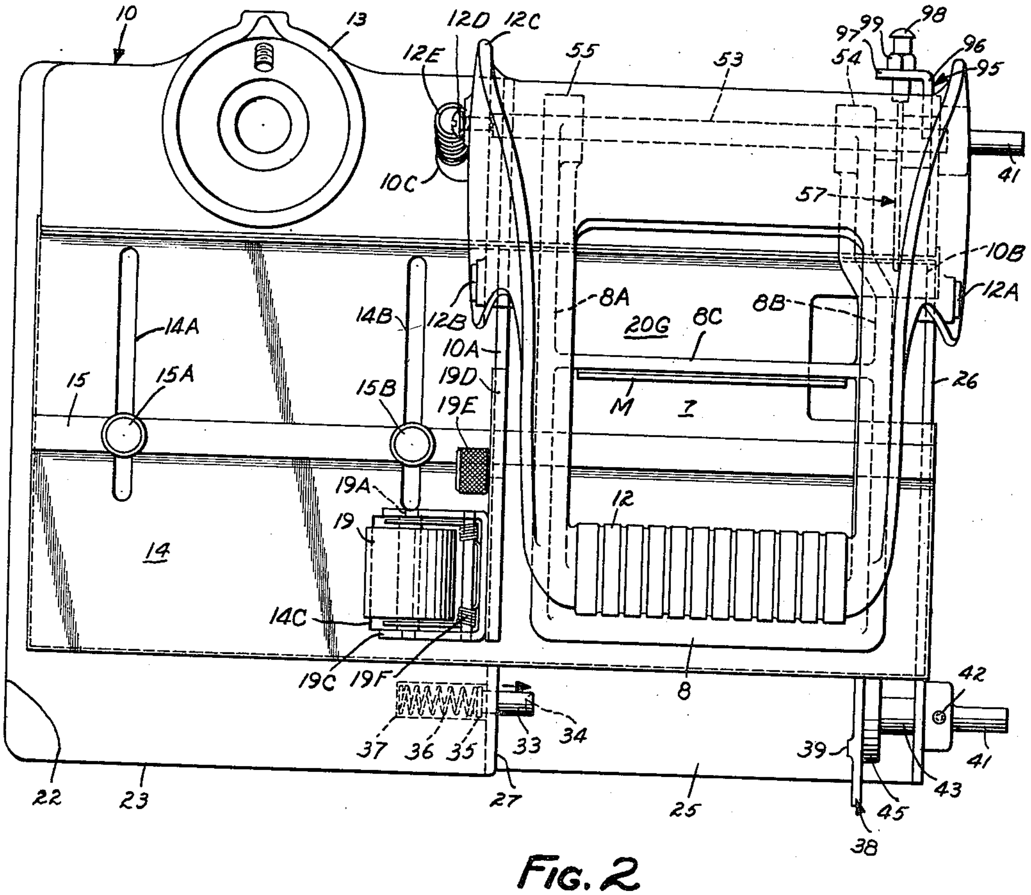
Figure 2 is a plan view of the duplicating machine of Figure 1.

From the main frame casting of the machine there is a forwardly extending arm 10A as shown in Figures 1 and 2 which serves as a support for the bracket 19C carrying roller 19, the roller being in turn provided with an axle at 19A. The roller axle moves up and down as well as rotates within the slots 19B in the bracket 19C, the bracket being mounted upon a slider 19D that slides on the brace 10A. The bracket is adjustably held by means of the screw 19E so that the bracket can be moved back and forth a slight amount as well as removed for cleaning. A spring 19F mounted upon a pin extending through bracket 19C has forwardly extending ends which bear upon the axle 19A of the roller 19 and cause the axle and hence the roller to be urged downwardly into contact with the roller 20. When paper material is being advanced through the machine for duplicating addresses or other data thereon, the movement of the paper material is from left to right as shown in Figures 1 and 2, and the paper stock moves between the rollers 20 and 19 and causes the rollers to rotate. Roller 19 exerts pressure downwardly upon and holds the paper, which for example may be a card or an envelope, firmly in engagement with the roller 20. As the material is moved from left to right, as shown in Figure 2, the roller 20 is thus rotated and liquid applied to the surface of the roller 20 is thus transferred to the underside of the paper material. The movement is then continued to the right and the envelope or letter is positioned under the duplicating end of the machine, as will presently be described.

Figures 3, 4:
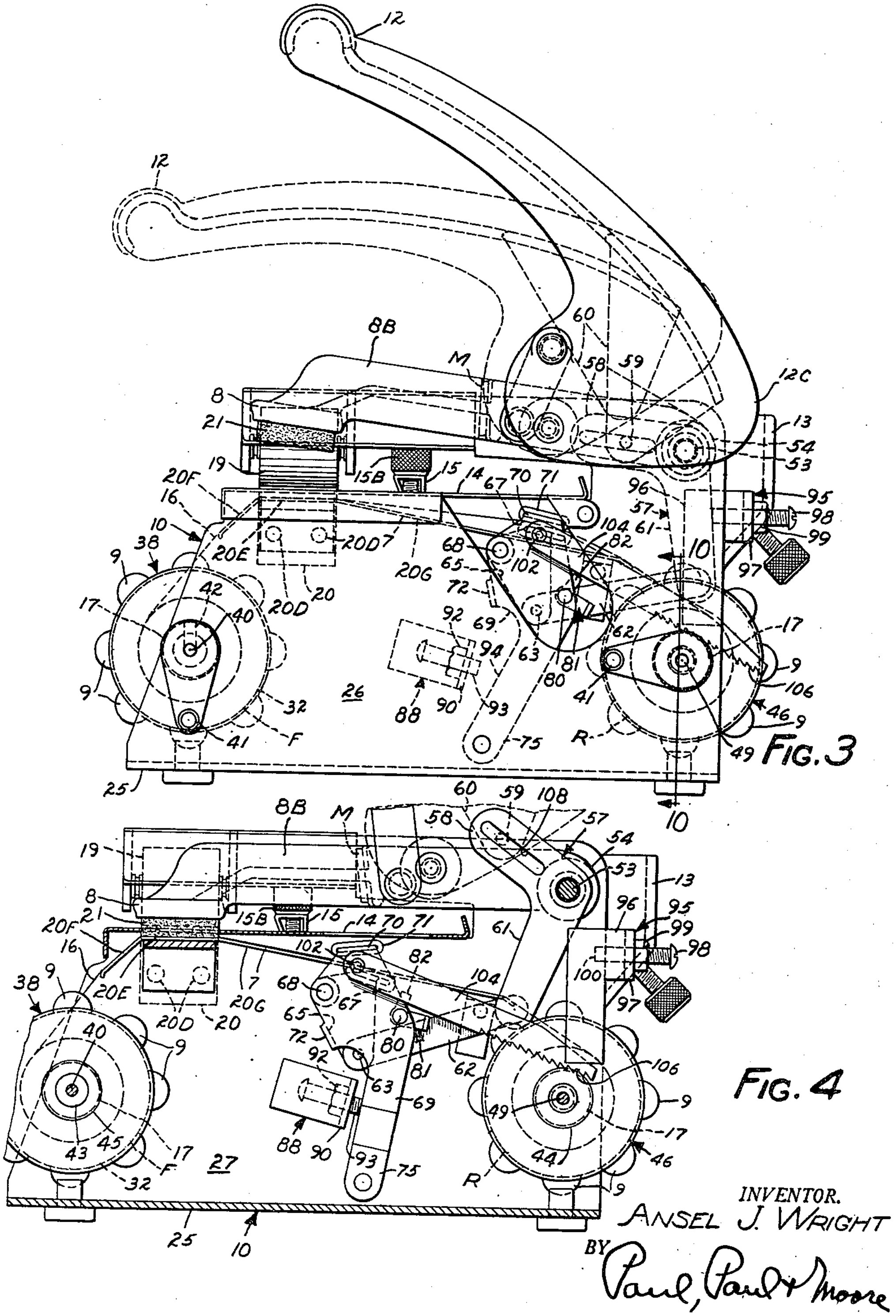
Figure 3 is a side elevation of the duplicating machine showing in full and dotted lines the operating travel of the impression handle.
Figure 4 is a view similar to Figure 3, but with the exterior frame broken away to more clearly illustrate the tape feeding mechanism.

The frame brace 10A, and a corresponding frame brace 10B, which extends only a short distance forwardly, from the rear portion of the main frame, serve as mountings for a pair of pivot pins 12A and 12B upon which the handle 12 of the duplicator machine is pivoted for movement around the pivots. The handle 12 has a rear portion 12C carrying anchor screw 12D upon which the upper end of a spring 12E is attached, the lower end of the spring being attached to a second anchor screw 12F that is inserted in the rear portion of the intermediate wall 27 of the machine frame. The upper portion of the machine frame 10 is provided with an aperture at 10C through which the spring 12E extends downwardly. The action of the spring 12E causes the handle 12 to move to the full line position shown in Figures 1–3. Upon the rear portion of the handle 12, 10A and 10B, is mounted a shaft 53 which serves as a pivotal mounting for the hubs 54 and 55 of the presser bar frame.

The presser bar frame has a front portion 8 which has a flat under-area to which the resilient padding 21 of rubber or the like is attached. The presser bar frame has rearwardly extending frame portions 8A and 8B having an intermediate brace at 8C. The rear ends of the frame braces 8A and 8B terminate in hubs 54 and 55 which are pinned to the shaft 53. At about the middle of the side pieces 8A and 8B, from front to back, there are provided pivot pins 8D and 8E to which the lower ends of a pair of links 8F and 8G are attached, the upper ends of these frame links being pivotally attached by means of the pins 12G and 12H to the handle member 12. Accordingly, when the handle is pushed down and against the action of spring 12E, the pivoted links 8F and 8G transmit a force downwardly upon the side frame members 8A and 8B of the presser bar and presser bar frame, and consequently cause the resilient pad 21 to be pushed downwardly to the position shown in Figure 4.

Stretching across from the wall 26 to the wall 27 there is a platen frame 7 which is held in place by the spotwelds 20D—20D. The platen frame has a flat and level upper area 20E which is slightly larger in area than the underside of the resilient pad 21. The platen frame also has a downwardly extending front apron 20F and a rearwardly extending apron 20G. The aprons 20F and 20G are slanted so that they approximately follow the path of the master tape of the machine and provide some support for that tape. By loosening the screws 20D—20D, the platen frame may be removed for cleaning and adjustment. The underside of the paper, envelopes, or other material, upon which the impression is to be made, as previously described, is moistened by action of the roll 20. When the envelope or other paper thus moistened is moved over to the positions so that it covers the platen surface 20E, the machine is ready for the operation of the handle 12. It is assumed that a tape bearing the typewritten data to be duplicated is in place on the platen 20E. When this is so, the handle 12 is brought down and this causes the presser bar 8 to move the resilient pad 21 firmly into contact with the upper surface of the paper, envelope, etc. thus forcing it firmly into engagement with the typed data on the tape thereby producing an impression. The handle 12 is then released and the impression is completed. The movement of the tape having typing thereon to be duplicated is accomplished step-by-step automatically in the present invention. In my prior patent, Reissue 23,279, the tape is moved by hand. The tape was advanced between each duplicating function manually by rotating the front roller to bring a fresh block of address data into place under the presser bar. In the present apparatus, this advancing of the tape is carried out automatically.

Referring to the drawings, the tape, which is generally designated 16, is carried upon a pair of spools, (a front spool F and a rear spool R) and the movement of the tape is from the front of the machine to the rear of the machine. Each of the spools is constructed identically and has a central hub 17 provided with end flanges 31 and 32, each of the end flanges being provided with a plurality of evenly spaced outwardly extending lobes 9—9 around the periphery thereof. The purposes of these lobes is to provide an easy union of the end of any of the spools to the spool holding mechanism for rotating the spools by means of the hand cranks, as will be described.

The left end of each of the spools, as shown in Figure 1, is supported by a spring center, thus as shown for the front spool F in Figure 1, there is provided a center 33 having a drill hole 34 in its open end which receives the axle pin 28 of the spool. The spring center 33 extends through the mid-wall 27 and inside the housing has a head flange at 35 which prevents the center 33 from passing all the way through the housing wall 27 in a direction to the right, as shown in Figure 2. The housing wall is provided with a recess at 37 containing the spring 36 which presses against the head flange 35 and therefore normally urges the center 33 to the right as shown by the arrow in Figure 2. Accordingly, when the spool is desired to be inserted the axle pin 28 of the spool is first inserted into the hole 34 in the end of the spring center and then by pushing on the spool the center is pushed back sufficiently so as to allow the spool to be swung into place. Both the front spool F and the rear spool R have identical spring centers at the left end of the spool as shown in the drawings Figures 1 and 2.

The right end of each of the spools is similarly mounted and is provided with a hand crank for hand rotation if desired. The mountings are quite similar and reference is made first to the front mounting. Thus, as shown in Figure 1, the right end flange 32 of the front spool F is settled into a shallow circular dish 38 which has an edge flange all the way around. The edge flange has extending lugs 39 which fit into the spaces between the lobes 9—9 on the spool, and thus key the dish 38 to the end of the spool. The dish 38 has a supporting hub at 43 provided with a shaft 40 that extends through the wall 26 and is held in place by the pin 42 which engages the shaft 40. A pin 29 on the end of the spool is received in a central hole within the portion 43 and the spool is thereby accurately centered. The spring center 33 always urges the spool to the right and hence the entire spool is held for rotation and yet can easily be removed from the machine.

Figure 10:
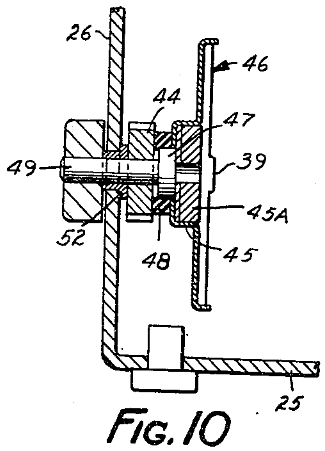
Figure 10 is a sectional view taken on the line 10—10 of Figure 3.

The construction of the corresponding right hand mounting for the rear spool R is similar and is shown in section in Figure 10. Thus, it will be noted that the wall 26 is provided with a bushing 52 through which the shaft 49 extends. The shaft 49 has an end flange 47 to which the dish end 46, corresponding to the member 38 for the front spool mounting, is mounted. Dish 46, it will be noted, has a section of reduced diameter 45 in which there is pressed a collar 45A. The only means of rotating the front spool F is either by gripping the spool itself and turning it or by means of the front crank 41. However, for the rear spool, rotation can be accomplished by means not only of the crank 41 mounted upon the rear spool shaft 49 but also by means of a ratchet gear 44 that is mounted for rotation upon the shaft 49 and is frictionally connected to the portion 45 of the driving dish 46 by means of the interposed frictional washer 48 of rubber, leather, or the like. When the rear spool R is in place against the dish 46, pressure is exerted through the spool by its rear spring center at the left end against the dish 46 which in turn imposes the pressure through the washer 48 against the side face of the ratchet gear 44. Accordingly, a driving torque can be transmitted from the ratchet 44 through the washer 48 to the dish 46 and hence to the spool.

The plan of operation for advancing the tape from front to rear between each duplicating operation contemplates the physical pulling of the tape 16 rearwardly by mechanical gripping of the tape and pulling it rearwardly a given distance between each duplicating operation. At the same time the rear spool 46 is rotated so as to take up the amount of tape thus pulled rearwardly toward the spool. Since the amount of tape on the spool increases as more tape is wound on to it, the amount of rotation necessary to take up the prescribed length of tape between each operation decreases as the spool becomes more and more full. To accommodate this decreased amount of rotation that is required, the ratchet 44 is arranged to be driven a sufficient amount so as to take up all of the tape that is pulled backwardly when the rear spool R is empty, through the rotation of the spool by the gear 44. The same amount of rotation of the ratchet gear 44 is always imposed, but as the rear spool R becomes more full it can only turn a lesser amount and hence slipping occurs at washer 48 between the rear spool mounting 46 and the gear 44. The mechanism for accomplishing this result is as follows:

Upon a downwardly extending flange 60 within the handle 12 there is mounted a pin 59 as is shown in Figures 3–8. The pin serves as the drive for a bell-crank lever 57 which is mounted upon the right end of the shaft 53. The bell crank lever 57 has a slot in it in the end 58 and the pin 59 works back and forth in the slot. Thus, as the handle 12 is moved from the full to the dotted line position shown in Figure 3, the pin 59 causes the end 58 of the bell crank 57 to move counter-clockwise, thus imposing counter-clockwise movement of the whole bell-crank about its pivotal mounting 53. The lower end of the slot in the bell crank 58 is shown at 108 in Figure 5. The opposite end 61 of the bell crank is pivotally connected through the link 62 to the pin 63 on a triangular gripper plate 65 which is in turn pivoted at 68 toward the upper end of a lever 69. The lever 69 is pivoted at 75 to the side wall 26. The triangular gripper plate has a bent over upper end 66 which is covered with a rubber sleeve 67. This rubber covered end 66 of the gripper plate 65 engages the lower surface of the right edge of the tape 16. Lever 69 which pivotally supports the triangular gripper plate 65 at 68 has a bent over end portion 70 which likewise is covered by a rubber sleeve 71. At the upper end of the lever 69 there is another pivot 102 to which one end of the ratchet bar 104 is attached. The ratchet bar, extending rearwardly and downwardly, has a plurality of ratchet teeth 106 which serve to engage the correspondingly shaped teeth of ratchet gear 44. Upon the lever 69 there is a small lever 81 which is pivotally mounted to the supporting lever 69 at the pivot 80.

Figure 9:
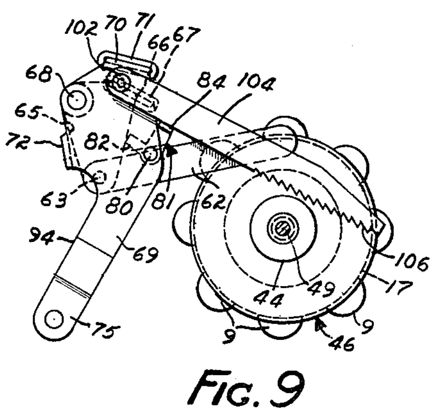
Figure 9 is a view similar to Figure 5, but shows the mechanism in inoperative or non-feeding position.

Lever 81 has an outwardly bent-over end flange 84 which engages the underside of the ratchet bar 104 elevating the ratchet for the elevation thereof to the inoperative position of Figure 9. The lever 81 has a bell cranked end 82 which is shaped and has a length such that it can be swung against the edge of the triangular gripper plate 65 in the position shown in Figure 9 and thus retained. In this position the bent-over end 84 of the lever 81 holds the lever 104 out of engagement with the ratchet 44. Thus, when lever 81 is swung from the position of Figure 1 to the position of Figure 9, ratchet bar 104 is elevated to the inoperative position shown and sleeves 67 and 71 held in the open position of Figure 9 even though handle 12 is reciprocated from the full line to dotted line position of Figure 3. Lever 81 is utilized to maintain bar 104 and sleeves 67 and 71 in the position of Figure 9 when manual feeding of the tape by rotation of either handle 41 is desired, or when it is desired to insert tape 16 between sleeves 67 and 71 for threading on spool R.

Figures 5, 6, 7, 8:
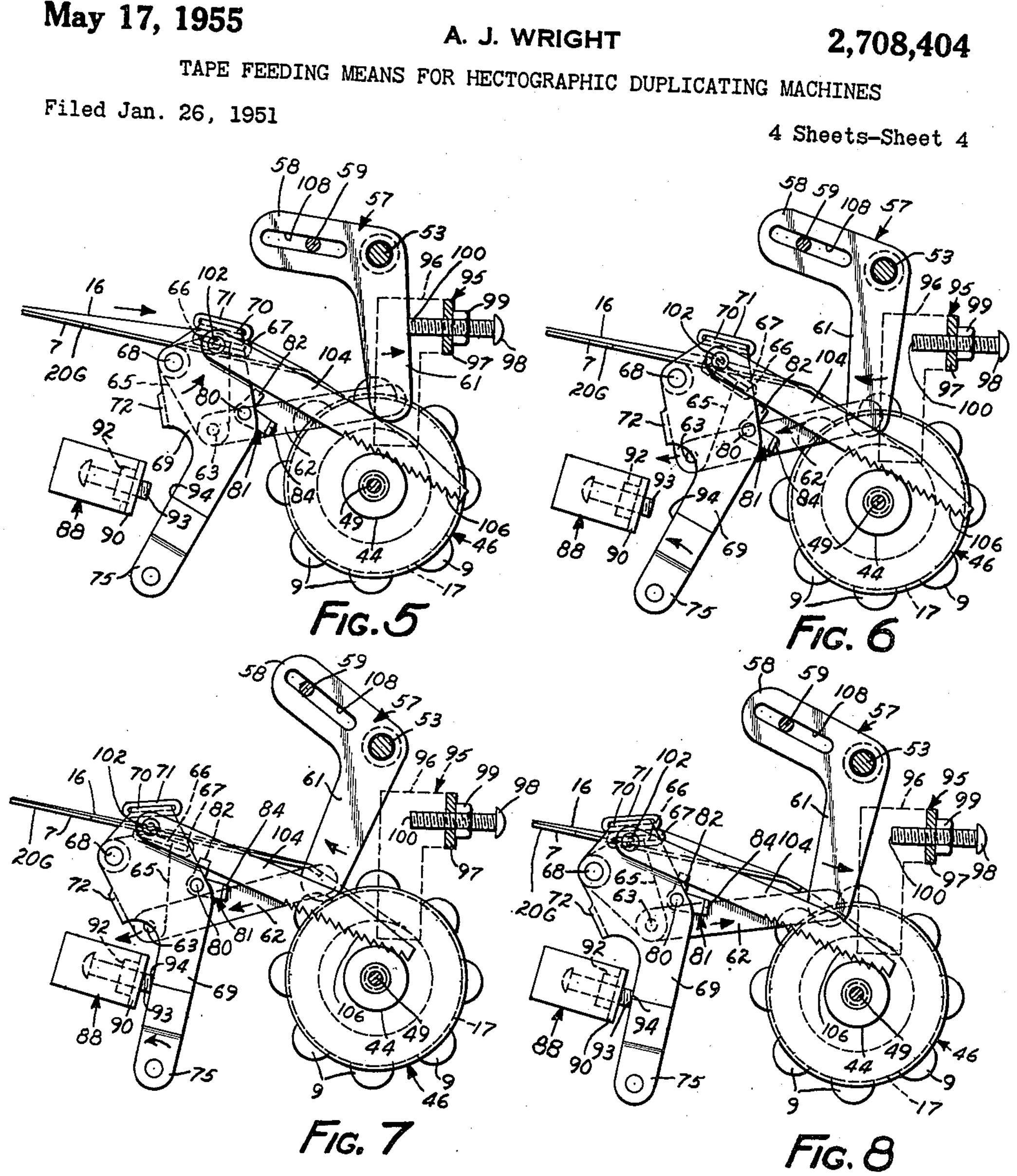
Figure 5 is a fragmentary view showing the feeding mechanism of the instant invention in side elevation and in initial or starting position.
Figure 6 is a view similar to Figure 5, but showing a second position of the operation of the tape feeding mechanism.
Figure 7 is a view similar to Figures 5 and 6 showing a third position of the operating mechanism.
Figure 8 is a view similar to Figures 5, 6 and 7, showing a fourth position of the operation of the mechanism.

The limit stops for the movement of the apparatus are actually three in number. The handle 12 being connected to the presser bar 8 is limited in its downward movement by the action of the presser bar 8 in exerting pressure through the resilient pad 21 against the surface 20B of the platen. Another stop in this same direction which serves more especially as a stop for the tape feeding mechanism is shown at 88. The stop is mounted upon the side wall 26 and is a bracket having a portion fastened to the end wall 26 and an inwardly extending flange at 90 which is threaded to receive the adjusting screw 93 that is locked by means of lock-nut 92. The end of the screw 93 engages at 94 against the lever 69 in the positions shown in Figures 7 and 8 and accordingly accurately limits the position to which such lever may be moved. This is important because the apparatus will have enough give to permit excessive movement in the absence of such stop and the stop thus serves accurately to determine the limit of movement of the tape feeding mechanism. Another stop 95 likewise mounted upon the end wall 26 has a portion 96 which is fastened to the end wall and a flange 97 extending inwardly with respect to the wall. This flange 97 is threaded to receive the adjusting screw 100 which is locked by lock nut 99. When the screw 100 is turned, the head 98 is adjusted inwardly or outwardly to determine the right hand position to which the end 61 of bell crank lever 57 may move as shown in Figure 5. The movement of the bell crank 57 (limited by stop 95) is transmitted through the slot 108 and pin 59 to the handle 12 and hence determines the up position thereof. The screw 100 also determines the open position of the tape gripping sleeves 67 and 71 and hence determines the limit of forward feeding movement of the tape feeding mechanism.

In operation the handle 12 is moved up and down for the imprinting function as previously described. When the handle is in the up position the tape feeding mechanism is in the position shown in Figure 5 and has just completed pulling the tape 16 rearwardly in the direction of the arrow shown in Figure 5. In this position, the portion 61 of the bell crank 57 has just finished moving in the direction of the arrow applied thereto and in so doing has pulled the triangular gripper plate 65 in the direction shown by the arrow and until it has assumed the position in which its sleeve 67 on the bent over end 66 has pushed the tape up firmly against the sleeve 71 on the bent over end 70 of the lever 69. As the lever 12 is moved downwardly during the imprinting function the tape feeding mechanism goes through the condition shown in Figure 6 to the condition shown in Figure 7.

In Figure 7 the handle 12 is all the way down and the imprinting function is just being made or has just been completed.

As the lever 12 begins its downward movement the pin 59 thereon causes the bell crank 57 to begin its movement (from Figure 5 to Figure 6). In the Figure 6 condition the triangular gripper plate 65 is in engagement with the stop 72 on the lever 69 and hence the two rubber covered gripping surfaces 67 and 71 are wide open. As the lever 12 continues its downward movement force is always applied in the direction of the arrow shown on portion 61 of the bell crank 57 (Figure 6) and this force is transmitted through the link 62 and to the plate 65. This holds the plate 65 against the stop 72, thus causing stop 72 to be moved forwardly of the machine (to the left in Figures 5–8) and hence cause the entire lever 69 to be moved in the direction of the arrow shown on that lever in Figure 6 until the lever 69 is stopped by screw 93, as shown in Figure 7. At this time also pressure pad 21 on the presser bar 8 functions to imprint the paper envelope against the platen 20E.

The operator then either lifts the handle 12 or permits it to move upwardly under the influence of spring 12E. The first thing that happens is that pin 59 on the handle 12 causes the bell crank lever 57 to begin its return movement in the direction of the arrow applied to the portion 61 of the bell crank, as shown in Figure 8, and this causes the link 62 likewise to move in the direction of the arrow applied thereto and causes the triangular gripper plate 65 to move away from the stop 72 and to rotate about its pivot 68 (all without moving the lever 69 from its stop screw 93), until the rubber sleeve 67 on the plate 65 pushes against the under surface of the paper tape 16 and lifts the paper tape into contact with the upper rubber sleeve pad 71 on the plate 65, thereby holding the tape 16 firmly between these gripping members 66 and 70. When this gripping action occurs then the only motion which can occur is the rotation of the lever 69 about its pivot 75 and such rotation does occur and movement of all the parts continues from the position shown in Figure 8 back to the position shown in Figure 5, and the gripping sleeves 67 and 71 are maintained in gripping relation on the right edge of the tape during this backward movement, thus causing the tape to be pulled rearwardly of the machine for the prescribed amount. At the same time, the ratchet bar 104 imposes rotation upon the ratchet gear 44. This rotation is always more than enough to take up the tape which is pulled back and hence some slippage occurs at the friction washer 48, but this is not disadvantageous.

Above the presser lever 8 and at the intermediate brace 8C there is provided a mirror M. When the operator is operating the machine, the mirror M permits the operator to read the addresses on the tape as the tape is pulled over the platen 20E and in the event any of the items on the tape are to be omitted, the operator can wind the tape back manually by rotating the crank 41.

In the event the tape should not be pulled back far enough, or is pulled too far, the position of the tape can be adjusted either forwardly or rearwardly by first pulling downwardly a little ways on the handle 12 so as to release the gripping sleeves 67 and 71 from the edge of the tape and then rotating either the front or rear crank, as required, so as to move the tape in their proper direction, or by placing lever 81 in the position shown in Figure 9 wherein the automatic tape feeding mechanism is inoperative.

As many apparently widely differing embodiments of this invention may be had without departing from the spirit and scope thereof, it is to be understood that I do not limit myself to the specific embodiments disclosed herein.

I claim as my invention:

1. A feeding mechanism for a duplicating machine having an impression means comprising in combination a first spool and a second spool, a tape wound upon said first spool and adapted to be unwound from said first spool and be wound upon said second spool, a pair of jaw members adapted to grip said tape for the feeding thereof through said machine, said jaw members being connected together for the gripping of said tape, means attaching one of said jaw members to the impression means of said machine, whereupon said jaw members will be actuated in synchronism with the operation of said impression means for the advancement of said tape, means connecting said second member of said jaw members with a ratchet means associated with said second spool whereby feeding operation of said jaw members in response to the operation of said impression means will produce rotation of said second spool for the winding of said tape thereon.

2. The apparatus of claim 1 further characterized by a disconnecting member adapted for movement from a first position to a second position, said disconnecting member when in said second position operatively disconnecting said member connecting said second jaw to said ratchet means and maintaining said jaws in an open and an inoperative position.

3. A feeding mechanism in a duplicating machine having an impression means for feeding a roll of master tape from a first spool to a second spool comprising jaw means pivoted together and adapted to grip said tape for the feeding thereof, means actuating said jaw members for the feeding thereof, said means comprising a link and a crank means attached thereto, said crank means attached to the impression means of said machine whereby said crank means is operated in synchronism therewith, a ratchet wheel connected by link means to said jaw members, said ratchet wheel attached to said second spool whereby said second spool may be rotated in synchronism with the feeding movement of said jaws.

4. A duplicating machine having a stationary platen and a presser head adapted for reciprocal movement into and out of engagement with said platen, said platen being mounted on a frame, a tape having thereon data to be reproduced, a pair of spaced spools one of which is positioned on one side of said platen and the other on the other side of said platen, said tape being carried upon said pair of spaced spools, said spools being mounted so that the tape may be unrolled from one spool and then drawn across the platen and taken upon the other spool, drive means connecting said reciprocal presser head and said take-up spool for winding said tape thereon, said drive means including a ratchet wheel on said take-up spool, a ratchet bar reciprocal across the face of said ratchet wheel, said ratchet bar being pivotally connected to an arcuate member, said arcuate member being operatively connected to said reciprocal presser head for movement in synchronization therewith and said arcuate member carrying a pair of jaws adapted to engage one edge of said tape for movement a predetermined distance.

5. The apparatus of claim 4 further characterized in that each of said spools is provided with a means for manually operating the same, and means provided for disconnecting said drive means whereby either of said spools may be manipulated for adjustment or manual operation.

6. A bed and platen hectograph addressing machine comprising in combination, a frame including an envelope supporting member at one end thereof and a substantially horizontal stationary platen in alignment therewith at the opposite end of said frame, a presser head pivotally connected to said frame at a point adjacent to the rear edge thereof, said presser head extending transversely of said frame from the rear edge thereof in a position above and forwardly thereof for substantially vertical operator- activated reciprocation into and out of engagement with the platen, a pad on the portion of the presser head reciprocatable into and out of engagement with the platen, a supply spool and a take-up spool rotatably mounted at opposite sides of said platen, a hectograph master tape carried by said spools and being movable from said supply spool to said take-up spool between said platen and said presser head pad, drive means connecting said presser head and said take-up spool for mechanically moving said tape directly a predetermined distance for each reciprocation of said presser head and for taking up said tape on said take-up spool as it is thus fed, said drive means comprising a mechanical linkage between said presser head and a means for gripping and advancing said tape, and a second means connected to said mechanical means for operation therewith for rotating said take-up spool.

7. The apparatus of claim 6 further characterized in that said take-up spool is provided with a slip clutch and said supply spool is an idler spool.

8. A duplicating machine having a stationary platen, a presser head adapted to be operator reciprocated into and out of engagement with the platen, a tape having data thereon to be reproduced, said tape being carried upon a pair of spaced spools, one positioned at either side of said platen, said spools being mounted so that the tape may be unrolled from one spool, drawn across the platen and taken up by the other spool, drive means connecting said movable presser head and said take-up spool for mechanically moving said tape directly a predetermined distance for each reciprocation of said presser head and for taking up said tape on the spool on which it is wound as it is thus fed, crank means connected to said presser head and a link connecting said crank means to a pair of jaws for gripping and feeding one edge of said master copy tape, and a ratchet means connecting said jaws to said take-up spool whereby said take-up spool will be rotated in response to the engagement of said jaws with said master copy tape.

References Cited in the file of this patent

UNITED STATES PATENTS

| | | |
|---|---|---|
| 496,484 | Newman | May 2, 1893 |
| 952,281 | Secor | Mar. 15, 1910 |
| 1,319,568 | Dahl | Oct. 21, 1919 |
| 1,986,678 | Laencher | Jan. 1, 1935 |
| 2,078,282 | Sadgebury | Apr. 27, 1937 |
| 2,280,095 | Metzner | Apr. 21, 1942 |
| 2,503,035 | Eriksen | Apr. 4, 1950 |
| 2,503,185 | Wright | Apr. 4, 1950 |
| 2,515,354 | Osborne | July 18, 1950 |
| 2,542,443 | Weber | Feb. 20, 1951 |
| 2,548,281 | Bartholomew | Apr. 10, 1951 |
| 2,554,028 | Helmond | May 22, 1951 |